US010807531B2

(12) United States Patent
Bruno et al.

(10) Patent No.: US 10,807,531 B2
(45) Date of Patent: Oct. 20, 2020

(54) AUGMENTED REALITY SYSTEM FOR AN AMUSEMENT RIDE

(71) Applicant: Universal City Studios LLC, Universal City, CA (US)

(72) Inventors: Dante Lamar Bruno, Orlando, FL (US); Gregory S. Hall, Orlando, FL (US); Shelby Nicole Honea, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/274,038

(22) Filed: Feb. 12, 2019

(65) Prior Publication Data

US 2020/0223360 A1 Jul. 16, 2020

Related U.S. Application Data

(60) Provisional application No. 62/792,209, filed on Jan. 14, 2019.

(51) Int. Cl.
*G06T 19/00* (2011.01)
*B60R 1/00* (2006.01)
*G06F 3/01* (2006.01)
*B62D 15/02* (2006.01)

(52) U.S. Cl.
CPC .............. *B60R 1/00* (2013.01); *B62D 15/029* (2013.01); *G06F 3/011* (2013.01); *G06T 19/006* (2013.01); *B60R 2300/20* (2013.01)

(58) Field of Classification Search
CPC ........... G06T 19/00; G06F 3/00; G06F 17/00; G09G 5/00; H04N 5/00
See application file for complete search history.

(56) References Cited

U.S. PATENT DOCUMENTS

| 8,079,916 | B2 | 12/2011 | Henry |
| 8,194,101 | B1 | 6/2012 | Mann et al. |
| 8,400,548 | B2 | 3/2013 | Bilbrey et al. |
| 8,814,691 | B2 | 8/2014 | Haddick et al. |
| 2005/0110964 | A1 | 5/2005 | Bell et al. |
| 2010/0097293 | A1 | 4/2010 | McMahon |
| 2015/0100179 | A1* | 4/2015 | Alaniz .................... A63F 13/00 701/1 |
| 2017/0345198 | A1 | 11/2017 | Magpuri et al. |
| 2018/0067307 | A1* | 3/2018 | Liubakka ........... G01C 21/3667 |
| 2018/0253141 | A1 | 9/2018 | McCracken |

FOREIGN PATENT DOCUMENTS

| CN | 107144958 | 9/2017 |
| EP | 2138213 | 12/2009 |

OTHER PUBLICATIONS

PCT/US2020/012454 International Search Report and Written Opinion dated Apr. 1, 2020.

* cited by examiner

*Primary Examiner* — Maryam A Nasri
(74) *Attorney, Agent, or Firm* — Fletcher Yoder, P.C.

(57) ABSTRACT

An amusement ride system includes a ride area, a ride vehicle configured to move within the ride area, a transparent display positioned between the ride area and a viewing area and configured to enable viewing of the ride vehicle from the viewing area, and a controller having a memory and a processor. The processor is configured to receive a sensor signal indicative of a position of the ride vehicle within the ride area and control an augmented reality image on the transparent display based on the position of the ride vehicle.

20 Claims, 6 Drawing Sheets

AUGMENTED REALITY SYSTEM FOR AN AMUSEMENT RIDE

CROSS-REFERENCE TO RELATED APPLICATIONS

This application claims priority from and the benefit of U.S. Provisional Application Ser. No. 62/792,209, entitled "AUGMENTED REALITY SYSTEM FOR AN AMUSEMENT RIDE", filed Jan. 14, 2019, which is hereby incorporated by reference.

BACKGROUND

The present disclosure relates generally to an augmented reality system, and more particularly to an augmented reality system for an amusement ride.

In some cases, an amusement ride may include a ride vehicle and a ride track. The ride vehicle may move along the ride track and may carry guests. The amusement ride may include entertainment features that enhance a guest's experience. For example, the amusement ride may include visual effects for viewing by guests seated within the ride vehicle or waiting in queue to board the amusement ride. However, it is now recognized that the entertainment features may not appear to be sufficiently realistic to the guests. Additionally, it is now recognized that the entertainment features may not appear to interact sufficiently with the guests or the amusement ride.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an amusement ride system includes a ride area, a ride vehicle configured to move within the ride area, a transparent display positioned between the ride area and a viewing area and configured to enable viewing of the ride vehicle from the viewing area, and a controller having a memory and a processor. The processor is configured to receive a sensor signal indicative of a position of the ride vehicle within the ride area and control an augmented reality image on the transparent display based on the position of the ride vehicle.

In an embodiment, an augmented reality system includes a transparent display configured to enable viewing of a ride vehicle of an amusement ride system, and a controller having a memory and a processor. The processor is configured to receive a first sensor signal indicative of a first position of the ride vehicle along a ride path and control an augmented reality image on the transparent display based on the first position of the ride vehicle.

In an embodiment, an amusement ride system includes a ride area, a ride vehicle configured to move within the ride area, and an augmented reality system. The augmented reality system includes a plurality of transparent displays configured to enable viewing of the ride vehicle and a controller having a memory and a processor. The processor is configured to receive a first sensor signal indicative of a first position of the ride vehicle within the ride area and control an augmented reality image on the plurality of transparent displays based on the first position of the ride vehicle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments of the present disclosure include an amusement ride system having an augmented reality system.

The augmented reality system may include a transparent display located generally between a viewing area and a ride area (e.g., ride an area with a ride path) of the amusement ride system. The amusement ride system may also include a ride vehicle that moves along the ride path adjacent to the transparent display. The transparent display may provide a set of augmented reality images or an augmented reality video (e.g., motion graphics) for viewing from the viewing area. For example, a guest positioned within the viewing area may simultaneously view the ride vehicle on the opposite side of the transparent display and the augmented reality images displayed by the transparent display (e.g., overlaid on top of the view of the ride vehicle). The augmented reality images may be synchronized with movement of the ride vehicle along the ride path (e.g., as the ride vehicle pulls in for unloading of guests or while the ride vehicle remains stationary for loading of guests) and may include depicting object(s) that appear to move across the transparent display and with the ride vehicle. The objects may appear to interact and move with the ride vehicle. As such, the guest positioned within the viewing area may view the ride vehicle and the depicted objects moving and/or interacting with the ride vehicle or guests in the ride vehicle. In this manner, the guest's experience within the amusement ride system may be enhanced while viewing the ride vehicle and/or the augmented reality images provided by augmented reality system. The augmented reality system may provide dynamic content for viewing from the viewing area on a stationary display that corresponds to physical activity in the ride area. The dynamic content may be based on and correlated to detected activity, as determined by sensors (e.g., cameras).

Figure 1:
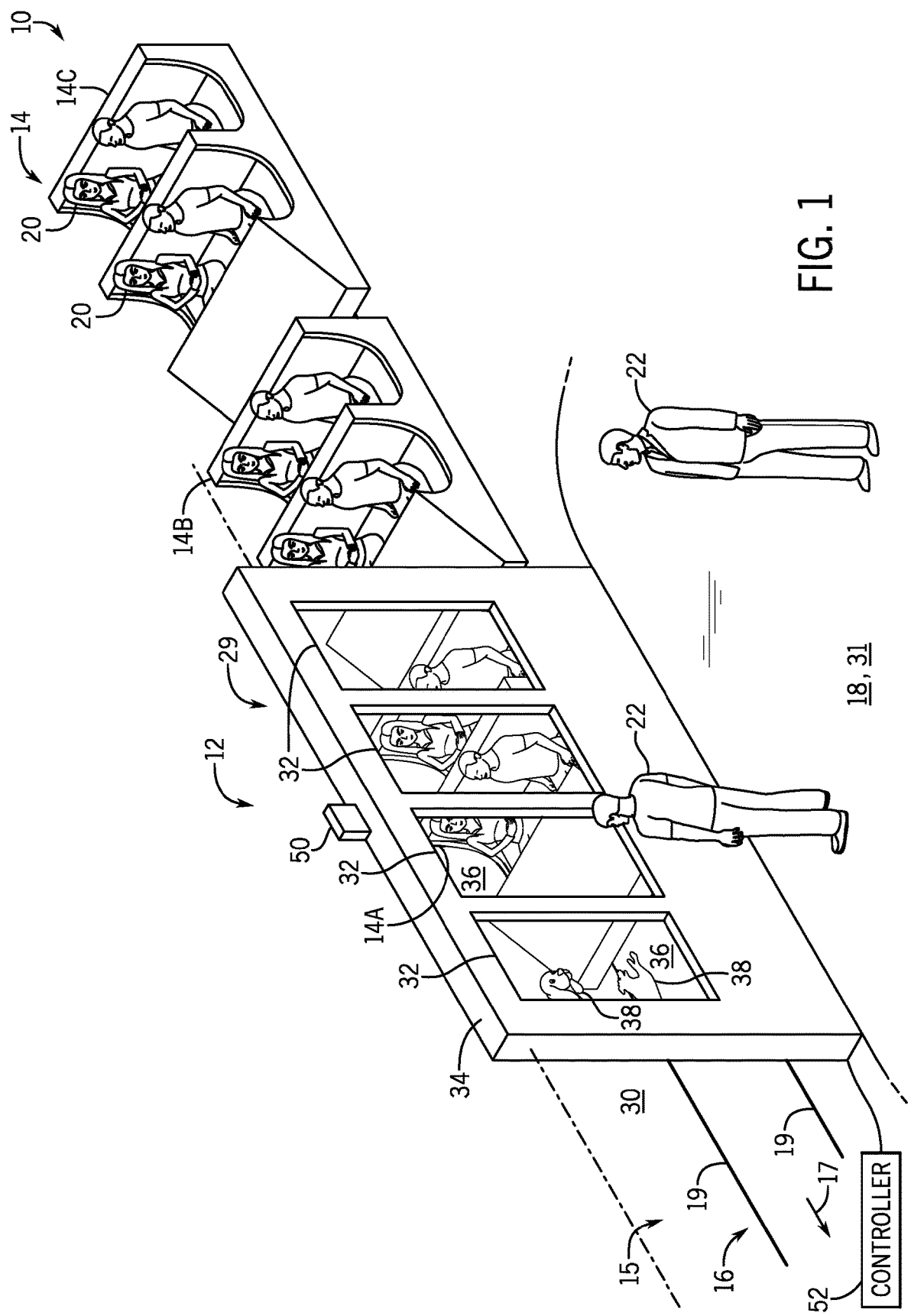
FIG. 1 is a perspective view of an embodiment of an amusement ride system having a ride vehicle in a first position and having an augmented reality system, in accordance with an aspect of the present disclosure.

With the foregoing in mind, the present embodiments relating to an augmented reality system may be utilized in any amusement ride or attraction system. For example, FIG. 1 is a perspective view of an embodiment of an amusement ride system 10 having an augmented reality system 12. As illustrated, the amusement ride system 10 includes one or more ride vehicles 14, a ride area 15, and a viewing area 18. In certain embodiments, the ride vehicles 14 may be connected to form a train or chain of ride vehicles 14. In some embodiments, each ride vehicle 14 may be disconnected and may move independently. Further, the ride area 15 includes a ride path 16 along which the ride vehicles 14 may move or travel along the ride path 16 in a direction 17 during operation of the amusement ride system 10. As illustrated, the ride path 16 includes ride tracks 19. In some embodiments, the ride path 16 may include other components in addition to, or in place of the tracks 19, to control movement of the ride vehicles 14. Further the ride path 16 may be omitted in some embodiments such that the ride vehicles 14 may move freely within the ride area 15.

As illustrated, the amusement ride system 10 includes three ride vehicles 14, however, the amusement ride system 10 may include more or fewer ride vehicles 14 in other embodiments (e.g., one ride vehicle 14, two ride vehicles 14, five ride vehicles 14, ten ride vehicles 14, or any other suitable number of ride vehicles 14). The ride vehicles 14 may carry participant guests 20 (e.g., guests participating in the amusement ride system 10) through the amusement ride system 10 at various speeds (e.g., 2 miles per hour (mph), 5 mph, 10 mph, 20 mph, 40 mph, 70 mph, 100 mph or any other suitable speed). For example, the amusement ride system 10 may be a roller coaster that includes the ride vehicles 14 traveling at high speeds (e.g., 50-100 mph) for the entertainment of the participant guests 20. In other embodiments, the amusement ride system 10 may be a slow-paced ride that includes ride vehicles 14 traveling at low speeds (e.g., 1-30 mph). The viewing area 18 may provide an area for viewing guests 22 to be positioned while viewing the amusement ride system 10 and the augmented reality system 12. In certain embodiments, the viewing area 18 may include one or more queues for the viewing guests 22 waiting to ride the amusement ride system 10 (e.g., waiting to enter the ride vehicles 14). Additionally or alternatively, the viewing area 18 may be an area outside the amusement ride system 10 such that the viewing guests 22 may be positioned outside the amusement ride system 10 while viewing the amusement ride system 10 and the augmented reality system 12.

The augmented reality system 12 may provide augmented reality images and/or animations (including motion graphics that include multiple, sequenced augmented reality images) synchronized with other portions of the amusement ride system 10 (e.g., movement of the ride vehicles 14 and/or the participant guests 20 in the ride vehicles 14) for viewing by the viewing guests 22. As illustrated, the augmented reality system 12 includes an augmented reality assembly 29 disposed generally between the ride area 15 and the viewing area 18. The ride area 15 is positioned on a first side 30 of the augmented reality assembly 29, and the viewing area 18 is positioned on a second side 31 of the augmented reality assembly 29. The augmented reality assembly 29 may include transparent displays 32 and a frame 34. The transparent displays 32 may be disposed within the frame 34 such that the transparent displays 32 appear to be windows within the frame 34. In certain embodiments, the displays 32 may be transparent, semi-transparent, and/or another suitable transparency or opaqueness that enables viewing of the ride vehicles 14 through the displays 32 while viewing images and animations (e.g., augmented reality images and animations) depicted on the displays 32. While the illustrated embodiment includes four transparent displays 32, other embodiments may include more or fewer transparent displays 32 (e.g., one transparent display 32, two transparent displays 32, five transparent displays 32, ten transparent displays 32, or any other suitable number of transparent displays 32). Further, each transparent display 32 may be disposed within an independent frame 34, and, in some embodiments, at least two independent frames 34 may be connected with one another. In certain embodiments, the frame 34 may be a wall or similar structure integrated into the amusement ride system 10 that separates the ride area 15 from the viewing area 18.

The transparent displays 32 may display augmented reality images 36. The transparent displays 32 may be transparent such that the viewing guests 22 may simultaneously view the ride vehicles 14, the participant guests 20 positioned within the ride vehicles 14, and the augmented reality images 36. For example, the transparent displays 32 may be organic light-emitting diode (OLED) displays that both provide the augmented reality images 36 and are transparent. In certain embodiments, the transparent displays 32 may include light emitting diode (LED) displays, liquid crystal displays (LCDs), plasma displays, or any other suitable display technology.

The augmented reality images 36 may depict object(s) 38 (e.g., two-dimensional portion(s) of the augmented reality images 36) that appear to be actual objects within the amusement ride system 10. As illustrated, the objects 38 are dogs. In certain embodiments, the objects 38 depicted within the augmented reality images 36 may depict scenery, animals, machines, vehicles, zombies, people, and/or any other moving or stationary objects. From the perspectives of the viewing guests 22, the objects 38 may appear to be positioned adjacent to the ride vehicles 14 within the ride area 15 of the augmented reality assembly 29. As such, the augmented reality system 12 may provide an illusion that the objects 38 are interacting with the ride vehicles 14, the ride path 16, the participant guests 20, and other portions of the amusement ride system 10. Further, as described in greater detail below, the augmented reality system 12 may cause the objects 38 to appear to move relative to one another and/or relative to the ride vehicles 14 and the transparent displays 32 (e.g., from a first object position to a second object position). For example, the augmented reality system 12 may provide multiple, sequenced augmented reality images 36 that appear as an animation or multiple animations across the transparent displays 32. The animation(s) may depict the objects 38 moving within the amusement ride system 10. In the animations, each frame may include a particular augmented reality image 36. The transparent displays 32 may display the frames (e.g., the augmented reality images 36) at any suitable speed, such as ranging from twenty-four frames per second (fps) to sixty fps.

In some embodiments, the augmented reality system 12 may provide the augmented reality images 36 based on the location(s) of the ride vehicle(s) 14 along the ride path 16, the location(s) and/or position(s) of the participant guests 20, and/or position(s) of other aspects of the amusement ride system 10 within the ride area 15 (e.g., actors/actresses, animatronics, animals, machinery, and props). For example, the augmented reality system 12 may include a ride area sensor 50 that determines the locations of the ride vehicles 14 along the ride path 16 and the locations of other aspects of the amusement ride system 10 (e.g., the locations and/or the positions of the participants guests 20). Based on the locations, the augmented reality system 12 may provide the augmented reality images 36 such that they are synchronized with the locations and/or movement of the ride vehicles 14 and the other aspects of the amusement ride system 10. As illustrated, the ride area sensor 50 is mounted to the augmented reality assembly 29. In certain embodiments, the ride area sensor 50 may be located elsewhere within the amusement ride system 10 (e.g., on a certain ride vehicle 14, on or adjacent to the ride path 16). In embodiments with the ride area sensor 50 fixed relative to the ride vehicles 14 (e.g., fixed to the ride track 19 or to the augmented reality assembly 29), the ride area sensor 50 may include a camera that determines locations of certain ride vehicles 14 as they pass by the ride area sensor 50. For example, certain ride vehicles 14 may include detectable markers (e.g., retroreflective markers) that the ride area sensor 50 (e.g., the camera) may detect to determine the respective locations of the certain ride vehicles 14. In certain embodiments, the participant guests 20 may carry and/or wear items with the detectable markers.

In certain embodiments, the augmented reality system 12 may include additional sensors that determine the positions of certain ride vehicles 14 or other aspects of the amusement ride system 10. For example, the augmented reality system 12 may include a velocity sensor that determines a velocity of the approaching ride vehicles 14. Based on the determined velocity, the augmented reality system 12 may provide the augmented reality images 36 such that the objects 38 appear to move at a related velocity (e.g., the augmented reality images 36 may form an animation that depicts the objects 38 moving at the related velocity) and/or interact with the approaching ride vehicles 14. Additionally or alternatively, the augmented reality system 12 may include an acceleration sensor that determines an acceleration of the ride vehicles 14 and may provide the augmented reality images 36 based on the determined acceleration.

In the illustrated embodiment, the amusement ride system 10 includes a front ride vehicle 14A, a middle ride vehicle 14B, and a rear ride vehicle 14C at first positions along the ride path 16. The ride area sensor 50 may determine the position of the front ride vehicle 14A as the front ride vehicle 14A approaches the ride area sensor 50 and passes by the transparent windows 32. Based on the determined position of the front ride vehicle 14A, and/or of the ride vehicles 14 generally, the augmented reality system 12 may provide the augmented reality images 36 such that the objects 38 within the augmented reality images 36 appear to be, for example, in front of and leading the ride vehicles 14. For example, the viewing guest 22 positioned within the viewing area 18 may simultaneously view the ride vehicles 14 and the objects 38 of the augmented reality images 36. From the perspective of the viewing guest 22, in some embodiments, the objects 38 may appear to be real objects positioned adjacent to the ride vehicles 14 and the ride path 16 within the ride area 15 of the augmented reality assembly 29. However, the objects 38 may simply be two-dimensional images displayed by the transparent displays 32.

As the ride vehicles 14 move along the ride path 16 in the direction 17, the augmented reality system 12 may display the augmented reality images 36 such that the augmented reality images 36 are synchronized with the ride vehicles 14. For example, the synchronization may include certain augmented reality images 36 designed, intended, and/or timed to be displayed based on target location(s) of the ride vehicles 14. By providing the augmented reality images 36, the augmented reality system 12 may provide animations along the transparent displays 32 that depict the objects 38 synchronized with the ride vehicles 14. When viewed from the perspectives of the viewing guests 22, the objects 38 may appear to be real objects that move and/or interact with the ride vehicles 14 and the participant guests 20. As such, the augmented reality system 12 may provide an exciting and interactive experience for the viewing guests 22 positioned within the viewing area 18.

To further enhance the experience of the viewing guests 22, the augmented reality system 12 may include audio features. For example, the audio features may be synchronized with the augmented reality images 36 and/or the objects 38 within the augmented reality images 36. The audio features may include sound effects, music, and/or other sounds that make the augmented reality images 36 and/or the objects 38 appear realistic. While positioned within the viewing area 18, the viewing guests 22 may view the ride vehicles 14, the participant guests 20, and/or the objects 38, and may simultaneously hear the audio features provided by the augmented reality system 12. In the illustrated embodiment, the audio effects may include a howl of a dog that may appear to come from the objects 38 (e.g., the dogs). As such, the augmented reality system 12 may provide a fun and/or frightening environment involving dogs in the illustrated embodiment. In certain embodiments, the augmented reality system 12 may provide other sounds associated with other types of the objects 38 (e.g., human sounds, machine sounds, nature sounds, or any other suitable sounds) for the entertainment of the viewing guests 22.

In certain embodiments, the audio features may be directional to make the sounds appear to come from a particular object 38 and/or from a particular direction. For example, as a particular object 38 moves across the transparent displays 32 via the updated augmented reality images 36 (e.g., via an animation formed by the updated augmented reality images 36), the location at which an audio feature associated with that particular object 38 is provided may vary. In another example, if the object 38 appears to move closer to the augmented reality assembly 29 as the augmented reality system 12 updates the augmented reality images 36, the augmented reality system 12 may increase the volume of sounds to create the illusion that the object 38 is moving closer to the augmented reality assembly 29 (and vice versa). As such, the audio features provided by the augmented reality system 12 may create the illusion that the object 38 is a real object moving within the amusement ride system 10.

In some embodiments, the augmented reality system 12 may include a speaker system that provides the audio features described above. For example, the speaker system may include a set of speakers positioned generally at each transparent display 32 such that each set of speakers may provide audio effects associated with the augmented reality image 36 on that particular transparent display 32. As the augmented reality images 36 are updated on each transparent display, the audio provided by the speaker system may vary to match or synchronize with the augmented reality images 36.

As illustrated, the transparent displays 32 are generally parallel to the ride path 16. However, in certain embodiments, one or more of the transparent displays 32 may be positioned at an angle relative to the ride path 16. While positioned at the angle relative the ride path 16, the transparent displays 32 may provide the augmented reality images 36 for viewing by the viewing guests 22. The angle at which particular transparent displays 32 are positioned may vary depending on a structure of the amusement ride system 10, a type of amusement ride system 10 (e.g., a high-speed roller coaster or a slow amusement ride), and/or the types of augmented reality images 36 or objects 38. The transparent displays 32 may be positioned at angles relative to the ride path 16 ranging from thirty degrees to sixty degrees in certain embodiments, and in other embodiments, the angles may range from five degrees to eighty-five degrees. In one embodiment, the transparent displays 32 may rotate to maintain an approximately perpendicular angle with the direction from a respective transparent display 32 to the ride vehicles 14.

The amusement ride system 10 and/or the augmented reality system 12 may include a controller 52 that provides/controls the augmented reality images 36. As illustrated, the controller 52 is communicatively coupled to the augmented reality assembly 29 and is configured to control the augmented reality system 12. For example, the controller 52 may receive a sensor signal indicative of the position of the ride vehicle 14 along the ride path 16. Additionally, the controller 52 may receive a signal indicative of the augmented reality images 36 (e.g., the signal may include data such as an image data file, a video file, or other suitable image files). For example, the controller 52 may receive the signal indicative of the augmented reality images 36 from a second controller, processor, memory or storage device, or other suitable source within or external to the amusement ride system 10 and/or the augmented reality system 12. That is, the second controller, processor, memory or storage device, or other suitable source may generate or receive the augmented reality images 36.

Based on the position of the ride vehicle 14, the controller 52 may output a control signal indicative of the augmented reality images 36 to the transparent display 32 to cause the transparent display 32 to display the augmented reality images 36 (e.g., may control the augmented reality images 36). In some embodiments, the controller 52 may output control signals to cause the transparent displays 32 to display multiple augmented reality images 36. Further, the controller 52 may continue to receive sensor signals indicative of the position of the ride vehicle 14 (e.g., an updated position of the ride vehicle 14) and/or signals indicative of updated augmented reality images 36, and based on the position of the ride vehicle 14, may output control signals indicative of the updated augmented reality images 36.

In certain embodiments, the control signals output by the controller 52 may be indicative of multiple, sequenced augmented reality images 36 that appear as an animation on the transparent displays 32. For example, after receiving the sensor signal indicative of the position of the ride vehicle 14, the controller 52 may output control signals to the transparent displays 32 indicative of the multiple, sequenced augmented reality images 36. The transparent displays 32 may then display the multiple, sequenced augmented reality images 36 that appear as the animation for viewing by the viewing guests 22.

In certain embodiments, the controller 52 may receive sensor signals indicative of the velocity or acceleration of the ride vehicle 14. Based on the velocity or acceleration of the ride vehicle 14, the controller 52 may output control signals indicative of the augmented reality images 36 (or the multiple, sequenced augmented reality images 36) to the transparent displays 32. As such, the controller 52 may output signals indicative of the augmented reality images 36 based on the position, velocity, or acceleration of the ride vehicle 14.

In certain embodiments, the controller 52 may generate the augmented reality images 36 based on image data stored in a memory of the controller 52. For example, after receiving the sensor signal indicative of the position of the ride vehicles 14, the controller 52 may generate and output the control signals indicative of the augmented reality images 36 to the transparent displays 32. Additionally or alternatively, the controller 52 may adjust, update, and/or modify the augmented reality images 36 previously received based on an updated position (e.g., a second position, third position, fourth position, or other suitable position) of the ride vehicles 14 and output control signals indicative of the updated augmented reality images 36 to the displays 32.

Figure 2:
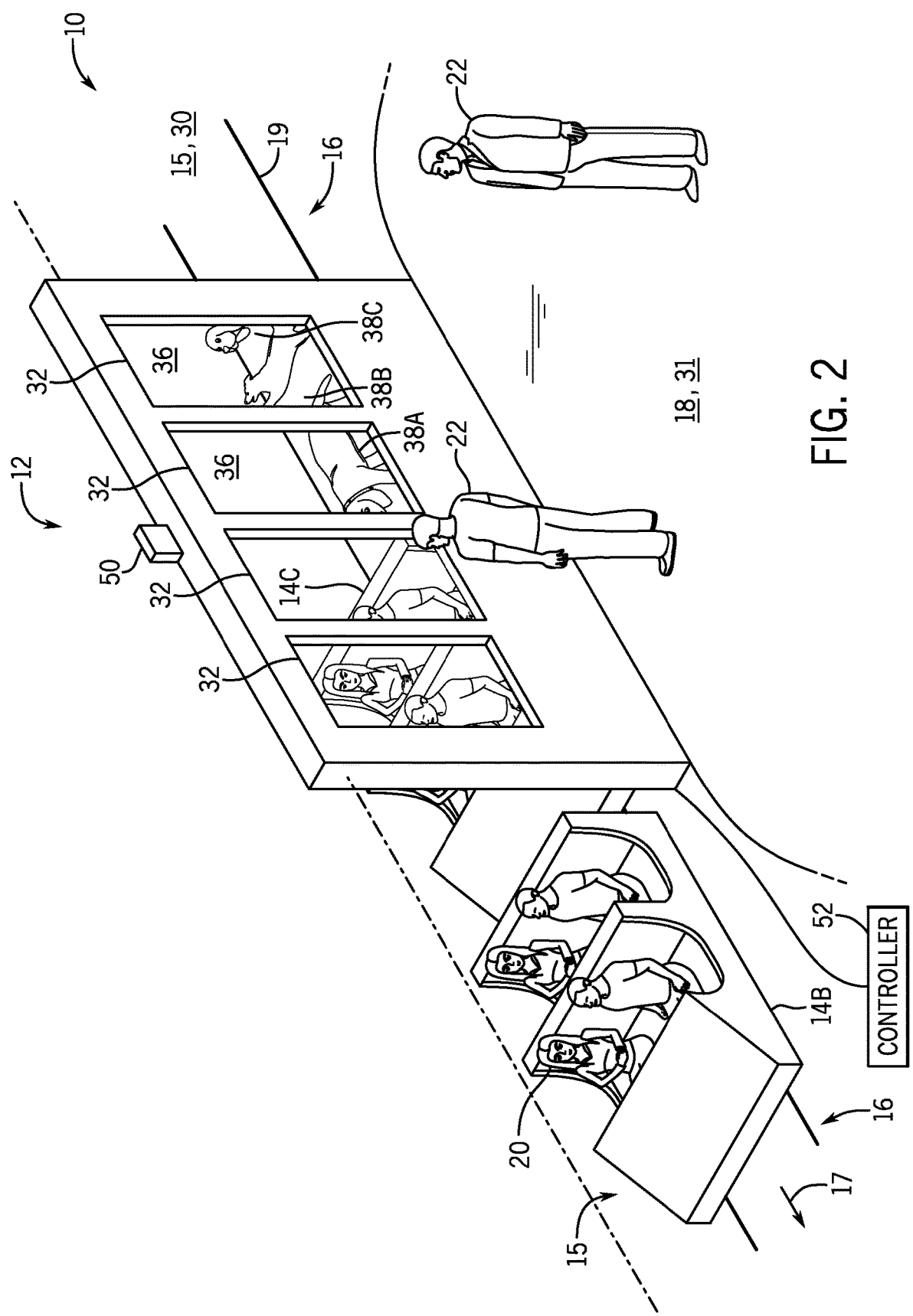
FIG. 2 is a perspective view of an embodiment of the amusement ride system of FIG. 1 having the ride vehicle in a second position, in accordance with an aspect of the present disclosure.

FIG. 2 is a perspective view of an embodiment of the amusement ride system 10 of FIG. 1 having the ride vehicles 14 in a second position. As illustrated, the ride vehicles 14 have moved further along the ride path 16 in the direction 17 from the first position of FIG. 1 to the second position of FIG. 2 (e.g., only the middle ride vehicle 14B and the rear ride vehicle 14C are visible). The ride area sensor 50 may determine that the ride vehicles 14 are in the second position, and the augmented reality system 12 may provide the updated augmented reality images 36 based on the second position. For example, the ride area sensor 50 may output a sensor signal indicative of the second position of the ride vehicles 14 to the controller 52 of the augmented reality system 12. Based on the second position, the controller 52 may output control signals indicative of the augmented reality images 36 to the transparent displays 32.

As illustrated, the updated augmented reality images 36 depict objects 38A, 38B, and 38C that appear to be positioned behind the ride vehicles 14 along the ride path 16. In the illustrated embodiment of FIG. 1 with the ride vehicles 14 in the first position, the objects 38 are positioned in front of the ride vehicles 14 along the ride path 16. As such, in FIG. 2, the augmented reality system 12 has updated the augmented reality images 36 to remove the objects 38 positioned in front of the ride vehicles 14 and to add the objects 38A, 38B, and 38C positioned behind the ride vehicles 14. As described in greater detail below, the augmented reality system 12 may continue to update the augmented reality images 36 and the objects 38 within the augmented reality images 36 based on updated positions of the ride vehicles 14. Additionally or alternatively, the augmented reality system 12 may provide the multiple, sequenced augmented reality images 36 that appear as an animation on the transparent displays 32.

As described above, in certain embodiments, the ride area sensor 50 may track the participant guests 20, items carried or worn by the participant guests 20, and other aspects of the amusement ride system 10. For example, if a participant guest 20 is carrying a stick with a detectable marker, the ride area sensor 50 may track the stick via the detectable marker within the ride area 15. Based on the position of the stick (or the other tracked objects) the augmented reality system 12 may provide the augmented reality images 36 such that the objects 38 appear to interact with and/or take the place of the stick on the transparent display 32. The objects 38 may include a torch to provide the appearance that the participant guest 20 is holding and/or moving the torch from the perspectives of the viewing guests 22. As such, the augmented reality system 12, via the ride area sensor 50, may enhance the experience of both the participant guests 20 and the viewing guests 22 by providing/controlling the augmented reality images 36.

Figure 3:
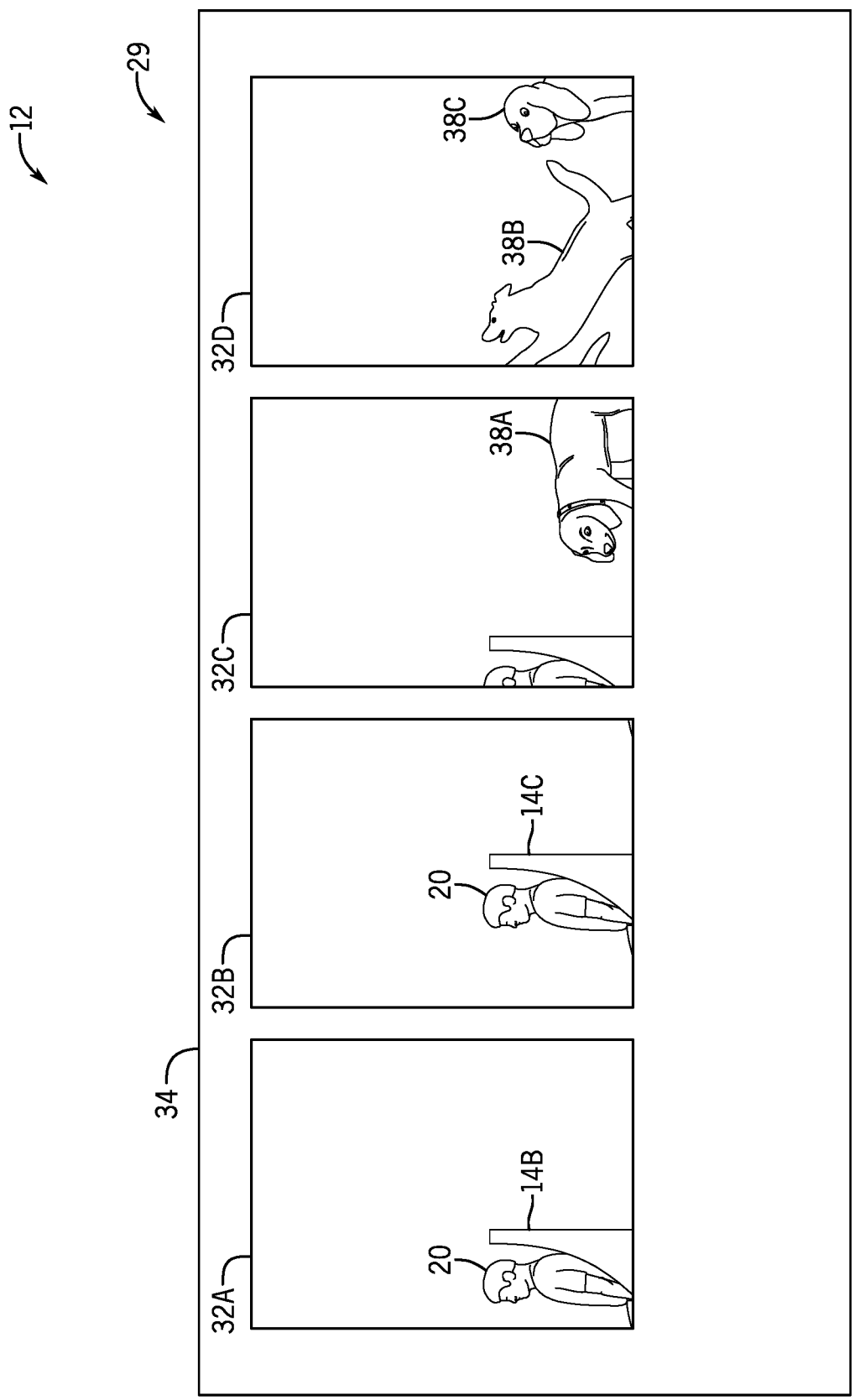
FIG. 3 is a side view of an embodiment of the ride vehicle of FIG. 2 in the second position and the augmented reality system of FIG. 1 including a display assembly displaying an augmented reality image, in accordance with an aspect of the present disclosure.

FIG. 3 is a side view of an embodiment of the ride vehicle 14 of FIG. 2 in the second position and the augmented reality system 12 of FIG. 1 including the augmented reality assembly 29 displaying the augmented reality images 36. The illustrated embodiment of the augmented reality system 12 may be from the perspective of the viewing guest 22 of FIG. 2. For example, the viewing guest 22 may view the ride vehicles 14 and the participant guests 20 generally through the first transparent display 32A, the second transparent display 32B, and the third transparent display 32C. The viewing guest 22 may also view the object 38A displayed by the third transparent display 32C and the fourth transparent display 32D and the objects 38B and 38C displayed by the fourth transparent display 32D. From the perspective of the viewing guest 22, the objects 38A, 38B, and 38C appear to be real objects positioned behind the ride vehicles 14 and the participant guests 20.

Figure 4:
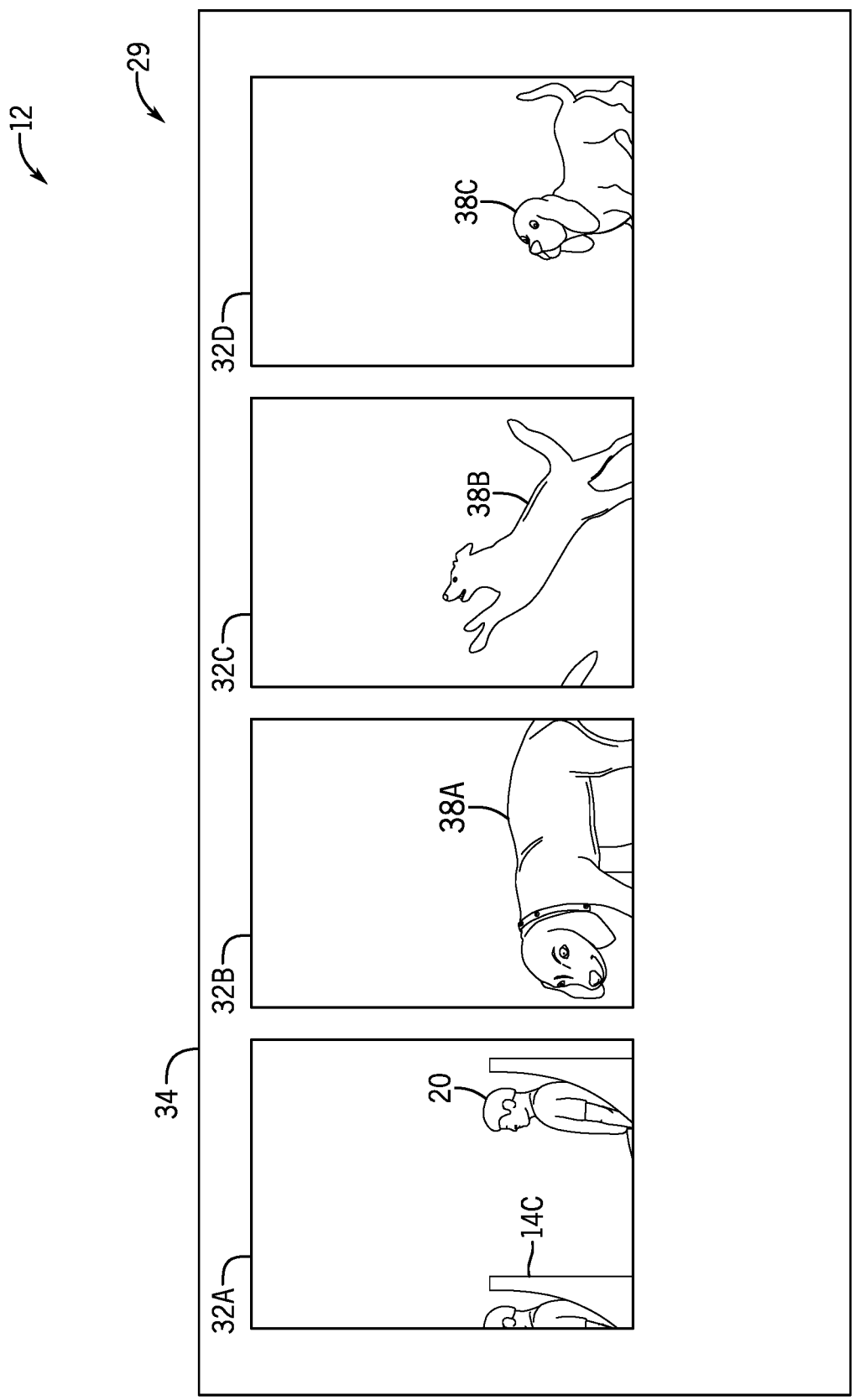
FIG. 4 is a side view of an embodiment of the ride vehicle of FIG. 2 in a third position and the augmented reality system of FIG. 1, in accordance with an aspect of the present disclosure.

FIG. 4 is a side view of an embodiment of the ride vehicle 14 of FIG. 2 in a third position and the augmented reality system 12 of FIG. 1 including the augmented reality assembly 29 displaying the augmented reality images 36. In the illustrated embodiment, the ride vehicles 14 have moved from the second position of FIGS. 2 and 3 to the third position of FIG. 4. The augmented reality system 12 has updated the augmented reality images 36 such that the objects 38 appear to have moved across the transparent displays 32 from first object positions to second object positions. For example, the object 38A appears to have moved from the third transparent display 32C to the second transparent display 32B. Additionally, a portion of the object 38A (e.g., the dog's tail) is displayed on the third transparent display 32C. The object 38B appears to have moved from the fourth transparent display 32D to the second transparent display 32B and the third transparent display 32C. The object 38C appears to have moved partially across the fourth transparent display 32D. The viewing guest 22 positioned within the viewing area 18 may view the ride vehicle 14 and participant guest 20 through the first transparent display 32A and may view the objects 38A, 38B, and 38C through the second transparent display 32B, the third transparent display 32C, and the fourth transparent display 32D. As such, each of the objects 38A, 38B, and 38C appears to have moved from first respective positions to second respective positions in coordination with actual movement of the ride vehicles 14 and the participant guests 20.

The augmented reality system 12 may provide the updated augmented reality images 36 based on the third position of the ride vehicles 14. For example, the ride area sensor 50 may determine that the ride vehicles 14 are at the third position and may output a sensor signal indicative of the third position of the ride vehicles 14 to the controller 52 of the augmented reality system 12. Based on the third position, the controller 52 may update the augmented reality images 36 and/or may output control signals indicative of the updated augmented reality images 36 to the transparent displays 32. The transparent displays 32 may then display the updated augmented reality images 36 for viewing by the viewing guests 22.

In certain embodiments, the updated augmented reality images 36 of FIG. 4 may be part of the multiple, sequenced augmented reality images 36 that form the animation across the transparent displays 32. For example, the augmented reality images 36 of FIG. 3 with the objects 38 at first positions may be part of a first portion of the animation, and the augmented reality images 36 of FIG. 4 with the objects 38 at second positions may be part of a second, later portion of the animation. Between the augmented reality images 36 of FIGS. 3 and 4, the augmented reality system 12 may provide any number of additional sets of augmented reality images 36 with the objects 38 at other positions such that the objects 38 appear to move fluidly across the transparent displays 32. Each set of augmented reality images 36 may be included in individual frames of the animation, and the augmented reality system 12 may provide the individual frames (e.g., the sets of augmented reality images 36) at a high rate (e.g., twenty-four to sixty fps) to make the objects 38 appear realistic.

In certain embodiments, the augmented reality system 12 may provide the augmented reality images 36 such that the objects 38 appear to move relative to the augmented reality assembly 29 (e.g., the objects 38 may appear to change depth within the amusement ride system 10). In the illustrated embodiment of FIG. 4, the augmented reality images 36 include a larger version of the object 38A compared to the augmented reality images 36 of FIG. 3, which provides the illusion that the object 38A has moved closer to the viewing guests 22 viewing the object 38A (e.g., the object 38A has changed depth within the amusement ride system 10).

In certain embodiments, the augmented reality system 12 may provide the augmented reality images 36 such that the objects 38 appear to move relative to one another and/or relative to the ride vehicles 14. In the illustrated embodiment of FIG. 4, the augmented reality images 36 depict the objects 38A and 38B farther from the object 38C compared to the augmented reality images 36 of FIG. 3. As such, the objects 38A and 38B may appear as if they have moved a greater distance and/or at a different speed compared to the object 38C. Additionally or alternatively, the movement of the objects 38 may provide a parallax effect within the amusement ride system 10. The parallax effect may include the objects 38 that appear to be closer to the viewing guests 22 moving more than the objects 38 that appear to be farther from the viewing guests 22 from the perspectives of the viewing guests 22. For example, the updated augmented reality images 36 may depict the objects 38 moving varying distances to provide the appearance that the objects 38 are positioned at different depths within the amusement ride system 10. As such, the augmented reality system 12 may provide the illusion that the objects 38 are real objects located at different positions and moving independent of one another within the amusement ride system 10.

In certain embodiments, the augmented reality system 12 may provide additional visual effects within the augmented reality images 36 to make the objects 38 appear realistic. For example, the augmented reality images 36 may include motion blur effects that cause the objects 38 to appear to move at high speeds (e.g., 50-100 mph). The motion blur effects may include slightly blurred versions of the objects 38 within the augmented reality images 36. As the augmented reality system 12 updates the augmented reality images 36, the blurring effects may change to simulate movement of the objects 38 across the transparent displays 32 at varying speeds (e.g., by increasing the blurring effects to simulate higher speeds and decreasing and/or removing the blurring effects to simulate lower speeds).

Additionally or alternatively, the visual effects provided by the augmented reality system 12 may include desaturation and/or heads-up display (HUD) style graphics. The desaturation effects may include varying the saturation of colors of the objects 38 in the updated augmented reality images 36 to make the objects 38 appear to move relative to one another, relative to the ride vehicles 14, and/or relative to the augmented reality assembly 29. The HUD-style graphics may include graphics that appear to be located within the transparent display 32 and within the augmented reality assembly 29 to provide the appearance that the graphics are overlaid on top of the objects 38. For example, the HUD-style graphics may include statistics and parameters of the amusement ride system 10, the participant guests 20, and the objects 38, and may appear as informational graphics. As such, the augmented reality system 12 may provide various visual effects to make the objects 38 appear as actual objects interacting with the ride vehicles 14, the participant guests 20, and/or other portions of the amusement ride system 10.

Figure 5:
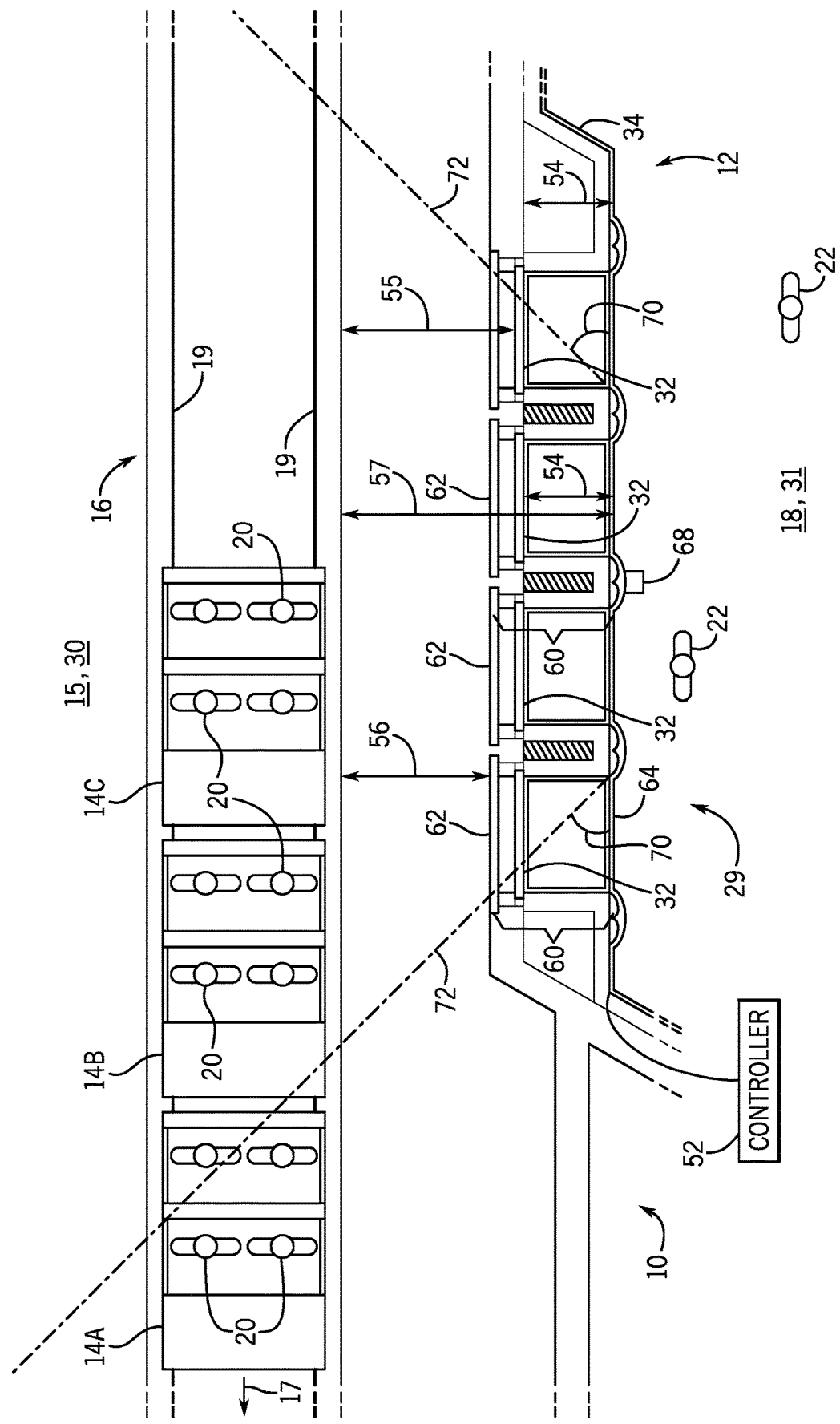
FIG. 5 is a top view of an embodiment of the amusement ride system and the augmented reality system of FIG. 1, in accordance with an aspect of the present disclosure.

FIG. 5 is a top view of an embodiment of the amusement ride system 10 and the augmented reality system 12 of FIG. 1. As illustrated, the amusement ride system 10 includes the ride area 15 positioned on the first side 30 of the augmented reality assembly 29 and the viewing area 18 on the second side 31 of the augmented reality assembly 29. Within the ride area 15, the ride vehicles 14 may move along the ride path 16 in the direction 17. The viewing guests 22 positioned within the viewing area 18 may simultaneously view the ride vehicles 14, the participant guests 20, and the augmented reality images 36 provided by the augmented reality system 12. The augmented reality assembly 29 may serve as a barrier separating the ride area 15 and the viewing area 18 and/or may be part of a wall or similar structure of the amusement ride system 10.

As described above, the augmented reality assembly 29 may include the transparent displays 32 positioned within the frame 34. The augmented reality assembly 29 also includes a viewing stall 60 for each transparent display 32. Each viewing stall 60 may provide a structured viewing perspective for the viewing guests 22 viewing the ride vehicles 14, the participant guests 20, and the augmented reality images 36 (e.g., may require the viewing guests 22 to view the portions of the amusement ride system 10 within the ride area 15 at particular distances and angles). As illustrated, the transparent displays 32 are offset from the viewing area 18 by a first distance 54 and are offset from the ride vehicles 14 by a second distance 55 to allow the objects 38 within the augmented reality images 36 to realistically and accurately appear to interact with the ride vehicles 14 from the perspectives of the viewing guest 22 (e.g., to provide a parallax effect). For example, the structure of the viewing stalls 60 requires the viewing guests 22 to be positioned at least the first distance 54 from the displays 32. Additionally, the perspective and line of sight of the viewing guests 22 viewing the ride vehicles 14 from the viewing area 18 may be restricted by the viewing stalls 60 to a particular viewing angle (described in greater detail below). The structure of the viewing stalls 60 (e.g., the first distance 54, the second distance 55, and the viewing angle) allows the augmented reality system 12 to accurately portray the parallax effect within the augmented reality images 36. In particular, the controller 52 of the augmented reality system 12 may display the objects 38 such that the objects 38 that appear to be closer to the viewing guests 22 move more than the objects 38 that appear to be farther from the viewing guests 22 to portray the parallax effect. In certain embodiments, the controller 52 may display the objects 38 such that the objects 38 appear to move different distances and at different speeds relative to one another and/or relative to the ride vehicles 14. As such, the controller 52 may portray the parallax effect to enhance the guests' experience by making the objects 38 appear to be real objects moving within the amusement ride system 10.

As illustrated, each viewing stall 60 includes a protective covering 62 on a first side of each transparent display 32 (e.g., the side facing the ride vehicles 14) and a viewing window 64 on a second side of each transparent display 32 (e.g., the side facing the viewing area 18). The protective covering 62 may protect the transparent display 32 and other portions of the augmented reality system 12 and the amusement ride system 10 from moving parts of the amusement ride system 10 (e.g., the ride vehicles 14 and any debris that may fall from the ride vehicles 14 and/or the participant guests 20). The protective covering 62 may be transparent such that the viewing guests 22 may see through and not notice the protective covering 62. The protective covering 62 may include a high-strength material, such as hurricane glass, that does not break or fracture when contacted by debris. As illustrated, the protective covering 62 is positioned a third distance 56 from the ride vehicles 14 and the ride path 16 to allow the ride vehicles 14 to freely move along the ride path 16 while still protecting the transparent display 32. The protective covering may facilitate maintaining the second distance 55 between the ride vehicles 14 and the displays 32. The viewing window 64 may be a protective window over the second side of the transparent display 32 that prevents the viewing guests 22 from contacting or getting too close to the transparent display 32. The viewing window 64 may include a lightweight, transparent material, such as glass or a thin plastic, that the viewing guests 22 may see through. Additionally, the viewing window 64 is positioned generally at the first distance 54 from the display 32 (e.g., the distance between the viewing area 18 and the display 32) and at a fourth distance 57 from the ride vehicles 14. As such, the transparent display 32 is disposed between two protective barriers (e.g., the protective covering 62 and the viewing window 64).

As described above, portions of the augmented reality system 12 may be offset from the viewing area 18 and from the ride vehicles 14 by particular distances. By way of example, the first distance 54 between the display 32 and the viewing area 18 may be between zero meters and one meter, the second distance 55 between the display 32 and the ride vehicles 14 may be between one meter and two meters, the third distance 56 between the protective covering 62 and the ride vehicles 14 may be between one half meter and two meters, and the fourth distance 57 between the viewing window and the ride vehicles 14 may be between two meters and three meters. In certain embodiments, the first distance 54 may be 0.6 meters, the second distance 55 may be 1.7 meters, the third distance 56 may be 1.4 meters, and the fourth distance 57 may be 2.35 meters.

While the viewing guests 22 are positioned at the particular distances from the ride vehicles 14 and the transparent display 32, the augmented reality system 12 may update the augmented reality images 36 such that the objects 38 move relative to the ride vehicles 14 and relative to one another in a physically accurate way. The objects 38 that appear closer to the viewing guest 22 may appear to move more than the objects 38 that appear farther from the viewing guest 22 (e.g., the parallax effect). In some cases, if the viewing guests 22 are not positioned at least at the particular distances from the ride vehicles 14 and the transparent display 32 (e.g., the viewing guests 22 are positioned less than the particular distances from the ride vehicles 14 and the transparent display 32), the augmented reality images 36 may not appear as realistic or may appear distorted because the parallax effect is not maintained. As such, the structure of the viewing stalls 60 and the amusement ride system 10 generally allow the augmented reality system 12 to realistically move the objects 38 within the augmented reality images 36 and along the transparent displays 32 and to prevent unrealistic viewing angles.

In certain embodiments, the augmented reality system 12 may include a guest-tracking sensor 68 that tracks one or more of the viewing guests 22. The guest-tracking sensor 68 may facilitate providing the augmented reality images 36 based on a position of the viewing guest 22 or based on the respective positions of multiple viewing guests 22. For example, the guest-tracking sensor 68 may determine the general position of the guest's head or another portion of the viewing guest 22 that is indicative of the guest's line of sight (e.g., the guest's body, the guest's eyes, or the guest's facial features). The guest-tracking sensor 68 may include any suitable sensor that determines the position of the guest's head or of another portion of the viewing guest 22. For example, the guest-tracking sensor 68 may include a camera that detects the guest's head, eyes, facial features, and/or other portions of the viewing guest 22. In some embodiments, the guest-tracking sensor 68 may be an infrared light that tracks the guest's eyes.

The guest-tracking sensor 68 may output a signal indicative of the position of the guest's head to the controller 52 of the augmented reality system 12. For example, while the viewing guest 22 is disposed within the viewing area 18, the guest-tracking sensor 68 may determine the position of the guest's head and may output the signal indicative of the position of the guest's head to the controller 52. The controller 52 of the augmented reality system 12 may then adjust, update, and/or provide the augmented reality images 36 displayed on the transparent displays 32 based on the position of the guest's head to accurately portray positions of the objects 38 and/or to maintain a parallax effect. To portray the parallax effect, the controller 52 may adjust/update the augmented reality images 36 such that some of the objects 38 that appear to be farther from the viewing guests 22 appear to move less than the objects 38 appearing to be closer to the viewing guests 22. As the viewing guest 22 moves around the viewing area 18 and/or relative to the augmented reality assembly 29, the controller 52 may provide the updated augmented reality images 36 based on the changed position of the guest's head.

As described above, the offset distances between the transparent window 32 and the viewing window 64 may provide the viewing guest 22 with a viewing angle 70. As illustrated, the viewing angle 70 is an angle between the viewing window 64 and a line of sight 72. The line of sight 72 may be the furthest portion of the amusement ride system 10 on the first side 30 of the augmented reality assembly 29 that the viewing guests 22 on the second side 31 may see when looking through the viewing stall 60. As such, the view of the viewing guests 22 may be limited to the area between the two lines of sight 72. In the illustrated embodiment, the viewing angle 70 is forty-four degrees. In certain embodiments, the viewing angle 70 may range from thirty degrees to sixty degrees.

One or more of the transparent displays 32 may be positioned at an angle relative to the ride path 16. Further, the viewing stalls 60 (and the protective coverings 62 and the viewing windows 64) may also be positioned at an angle relative to the ride path 16. While positioned at the angle relative the ride path 16, the transparent displays 32 within the viewing stalls 60 may provide the augmented reality images 36 for viewing by the viewing guests 22. The angle at which particular viewing stalls 60 are positioned may vary depending on a structure of the amusement ride system 10, the type of the amusement ride system 10 (e.g., high-speed roller coaster or slow amusement ride), and/or the types of augmented reality images 36 or objects 38. Further, the position of the objects 38 within the augmented reality images 36 may vary depending on the angle of the transparent displays. For example, to realistically provide the objects 38 within the amusement ride system 10, the objects 38 on the angled transparent displays 32 may be displayed from varying perspectives. The viewing guests 22 may view the objects 38 from the varying perspectives. As such, the viewing guests 22 may view the objects 38 on a first transparent display 32 positioned at a first angle from a first perspective and may view the objects 38 on a second transparent display positioned at a second angle from a second perspective. The angled transparent displays and the varying perspectives may enhance the appearance of the objects 38 being real objects positioned within the amusement ride system 10.

Figure 6:
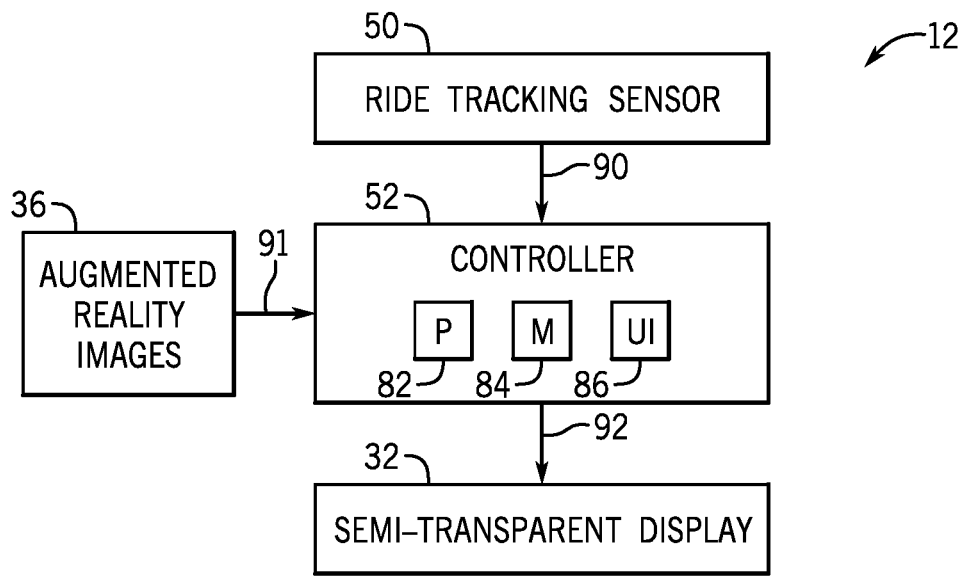
FIG. 6 is a block diagram of an embodiment of the augmented reality system of FIG. 1, in accordance with an aspect of the present disclosure.

FIG. 6 is a block diagram of an embodiment of the augmented reality system 12 of FIG. 1. As illustrated, the ride area sensor 50 and the transparent display 32 are each communicatively coupled to the controller 52 of the augmented reality system 12. The controller 52 includes a processor 82, a memory 84, and a user interface 86. The controller 52 may output control signals 92 indicative of augmented reality images 36 to the transparent display 32 of FIG. 1 for display based on sensor signals 90 received from the ride area sensor 50 and image data signals 91 indicative of the augmented reality images 36 received from a second controller or other source. In certain embodiments, the controller 52 may store image data indicative of the augmented reality images 36 in the memory 84. Further, the controller 52 may update, modify, and/or generate the augmented reality images 36, via the processor 82, based on the image data stored in the memory 84.

The ride area sensor 50 may determine the position of the ride vehicle 14 and may output a sensor signal 90 indicative of the position of the ride vehicle 14 to the controller 52. Based on the position of the ride vehicle 14, the controller 52, via the processor 82, may cause the transparent display 32 to display the augmented reality images 36. In some embodiments, the controller 52, via the processor 82, may adjust and/or update the augmented reality images 36. The update to the augmented reality images 36 may include maintaining the parallax effect described above that includes causing the portions of the augmented reality images 36 that appear closer to the viewing guest 22 to move more than the portions of the augmented reality image 36 that appear farther from the viewing guest 22. The controller 52 may output a control signal 92 indicative of the augmented reality images 36 to the transparent display 32. Based on the control signal 92 received from the controller 52, the transparent display 32 may display and/or update the augmented reality images 36 for viewing by the viewing guests 22.

The controller 52 may initially start outputting the control signals 92 to the transparent display 32 based on certain factors. For example, the controller 52 may receive an input to the user interface 86 indicative of instructions to begin outputting the control signals 92. In response, the controller 52 may output a control signal to the ride area sensor 50 to cause the ride area sensor 50 to begin tracking/determining the position of the ride vehicle 14. Based on an initial sensor signal 90 indicative of an initial position of the ride vehicle 14, the controller 52 may output the control signal 92 indicative of the augmented reality images 36 to the transparent display 32. In certain embodiments, the augmented reality system 12 may automatically determine the presence and position of the ride vehicle 14, via the ride area sensor 50, and the controller 52 may automatically cause the transparent display 32 to begin displaying the augmented reality images 36 for viewing by the viewing guest 22 without an input to the user interface 66.

The ride area sensor 50 may continually detect the position of the ride vehicle 14 and may output the sensor signals 90 to the controller 52 indicative of the position of the ride vehicle 14. In response, the controller 52 may update the augmented reality images 36 based on the position of the ride vehicle 14 and may output the control signals 92 indicative of the updated augmented reality images 36 to the transparent display 32 (e.g., as illustrated in FIGS. 2-4). In certain embodiments, the controller 52 may update the augmented reality images 36 based on other detected aspects of the amusement ride system 10. For example, the sensor signals 90 may be indicative of a position and/or of movement of the participant guests 20 or the items carried or worn by the participant guests 20, and the updated augmented reality images 36 may be based on such sensor signals 90.

The transparent display 32 may provide the updated augmented reality images 36 for viewing by the viewing guest 22. Portions of the updated augmented reality images 36 (e.g., the objects 38) may appear to move compared the previous augmented reality images 36 that was provided by the controller 52. As such, the augmented reality system 12, via the controller 52, may provide the parallax effect such that the portions of the augmented reality images 36 move relative to the ride vehicle 14 and relative to one another from the perspective of the viewing guest 22. The augmented reality system 12 may stop providing the augmented reality images 36 based on a user input to the user interface 86, based on an elapsed time period, based on the ride area sensor 50 no longer detecting the position of the ride vehicle 14, and/or based on other factors.

In certain embodiments, the controller may output the control signals 92 indicative of the multiple, sequenced augmented reality images 36 to the transparent display 32 based on the position of the ride vehicle 14 and based on the image data associated with the augmented reality images 36. The transparent display 32 may display the multiple, sequenced augmented reality images 36 as an animation or as multiple animations that appear to interact and/or move with the ride vehicle 14.

In certain embodiments, the controller 52 may be communicatively coupled to other portions of the augmented reality system 12. For example, the controller 52 may be communicatively coupled to the guest-tracking sensor 68 described above such that the controller 52 may receive the signals indicative of the position of the viewing guest 22 from the guest-tracking sensor 68 and may provide the augmented reality images 36 based on the position of the viewing guest 22.

In certain embodiments, the amusement ride system 10 and/or the augmented reality system 12 may include additional controllers, processors, and/or memories to perform various functions. For example, each transparent display 32 may include a controller that receives the sensor signals 90 from the ride area sensor 50, controls the augmented reality image 36 on the respective transparent display 32 via the control signals 92, and/or communicates with a central controller (e.g., the controller 52). In some embodiments, the memory 84 and other memories of the amusement ride system 10 may include one or more tangible, non-transitory, computer-readable media that store instructions executable by the processor 82 and/or data to be processed by the processor 82. For example, the memory 84 may include random access memory (RAM), read-only memory (ROM), rewritable non-volatile memory such as flash memory, hard drives, optical discs, and/or other types of memory. Additionally, the processor 82 and other processors of the amusement ride system 10 may include one or more general purpose microprocessors, one or more application-specific integrated circuits (ASICs), and/or one or more field programmable gate arrays (FPGAs).

The user interface 86 may facilitate communication between the controller 52 and a user (e.g., an operator). The user interface 86 may be disposed adjacent to the amusement ride system 10 or at a remote location in the case of a remotely controlled or autonomously operated amusement ride system. For example, the user interface 86 may include one or more of a button, a keyboard, a mouse, a trackpad, and/or the like to enable user interaction with the controller 52. Additionally, the user interface 86 may include an electronic display to provide a visual representation of information, for example, via a graphical user interface (GUI), an application interface, text, a still image, video content, or a combination thereof. The user interface 86 may receive inputs from the user (e.g., the operator of the amusement ride system 10 and/or the augmented reality system 12). For example, the inputs to the user interface 86 may include desired augmented reality effects to be provided by the augmented reality system 12 within the amusement ride system 10.

The ride area sensor 50 and/or the transparent display 32 may be connected to and communicatively coupled with the controller 52 via a wired connection (e.g., Ethernet, universal serial bus (USB), controller area network (CAN) bus, or a serial control and communications data network (an "ISO bus")). For example, the ride area sensor 50 may output the sensor signals 90 to, and the transparent display 32 receive the control signals 92 from, the controller 52 via the wired connection. Additionally or alternatively, the ride area sensor 50 and/or the transparent display 32 may communicate with the controller 52 via a wireless connection. For example, the transparent display 32 may include a transceiver that receives the control signals 92 from a controller transceiver of the controller 52. Each of the transparent display 32 transceiver and the controller transceiver may utilize any suitable wireless communication protocol, such as a standard protocol (e.g., Wi-Fi or Bluetooth), or a proprietary protocol.

Figure 7:
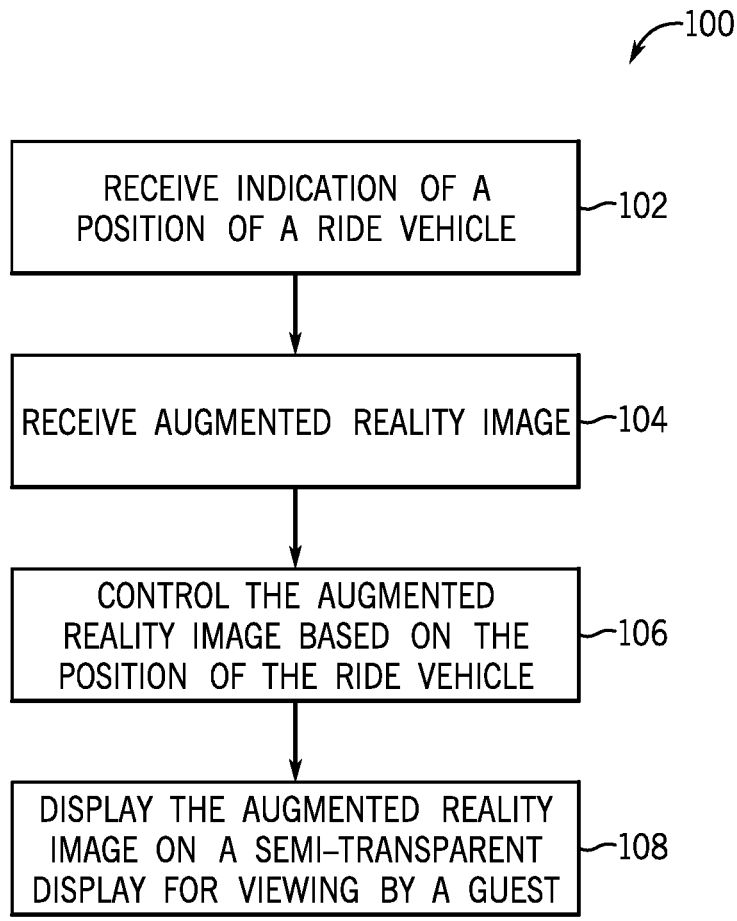
FIG. 7 is a flow chart of an embodiment of a process for receiving and displaying an augmented reality image based on a position of a ride vehicle for the augmented reality system of FIG. 1, in accordance with an aspect of the present disclosure.

FIG. 7 is a flow chart of an embodiment of a process 100 for receiving and displaying the augmented reality images 36 for the augmented reality system 12 of FIG. 1. The process 100 may be in the form of one or more software applications that include instructions that are executed by at least one suitable processor, such as the processor 82 of the controller 52 of the augmented reality system 12. The illustrated process 100 is merely provided as an example, and in other embodiments, certain illustrated steps of the process 100 may be performed in other orders, skipped, or repeated, in accordance with the present disclosure.

As illustrated, in process block 102, the processor 82 receives an indication of a position of the ride vehicle 14. For example, the ride area sensor 50 may determine the position of the ride vehicle 14 and may output the sensor signal 90 indicative of the position of the ride vehicle 14 to the controller 52 of FIG. 6. The processor 82 may thus receive the sensor signal.

In process block 104, the processor 82 receives the augmented reality image 36. The augmented reality image 36, or image data indicative of the augmented reality image 36 may be received from a second controller or another source of the augmented reality system 12. For example, the augmented reality image 36 may be received as a user input to the user interface 86 or may be generated by the second controller. The augmented reality image 36 may depict the objects 38 that appear to be actual objects within the amusement ride system 10.

Next, the processor 82 controls (e.g., updates and/or provides) the augmented reality images 36 based on the position of the ride vehicle 14 (e.g., block 106). For example, the processor 82 may output the control signal indicative of the augmented reality images 36 to the transparent display 32 based on the sensor signal indicative of the position of the ride vehicle 14 received from the ride area sensor 50. In certain embodiments, the controller 52 may receive the sensor signal indicative of the position of the viewing guest 22 from the guest-tracking sensor 68. The controller 52 may provide the augmented reality images 36 based on both the position of the ride vehicle 14 and the position of the viewing guest 22. As the respective positions of the ride vehicle 14 and the viewing guest 22 change, the controller 52 may adjust and/or update the augmented reality images 36 such that the objects 38 that appear to be closer to the viewing guest 22 may move more (e.g., may have a greater parallax) than the objects 38 that appear to be farther from the viewing guest 22. As such, the controller 52 may provide the parallax effect that includes the objects 38 moving relative to one another and/or relative to the ride vehicle 14 from the perspective of the viewing guest 22.

In process block 108, the augmented reality system 12 displays the augmented reality images 36 on the transparent display 32 for viewing by the viewing guest 22 (e.g., the transparent displays 32 display the augmented reality images 36 based on the control signals received from the processor 82). The viewing guest 22 may simultaneously view the ride vehicle 14 and the augmented reality images 36 (e.g., the objects 38) such that the ride vehicle 14 and the augmented reality images 36 appear to be part of the same image.

The augmented reality system 12 may iteratively repeat the process 100 while the viewing guest 22 is positioned within the viewing area 18 and/or while the viewing guest 22 is viewing the transparent display 32. For example, after providing initial augmented reality images 36 for viewing by the viewing guest 22, the augmented reality system 12 may repeat each of blocks 102, 104, and 106 to update the augmented reality images 36 based on updated positions of the ride vehicle 14. In certain embodiments, the augmented reality system 12 may update the augmented reality images 36 based on updated positions of the viewing guest 22. With each iteration of the process 100, the objects 38 may appear to interact with the ride vehicle 14 and may appear to move with the ride vehicle 14 from the perspective of the viewing guest 22.

Accordingly, the amusement ride system 10 and the augmented reality system 12 of FIG. 1 provide an entertaining and interactive environment for the viewing guest 22. The augmented reality system 12 may provide augmented reality effects including the objects 38 within the augmented reality images 36 that appear to interact with the ride vehicles 14 and the amusement ride system 10 generally. From the perspective of the viewing guest 22, the objects 38 may appear to be real objects within the amusement ride system 10. For example, the augmented reality system 12 may include a ride area sensor 50 that determines the position of the ride vehicle 14, and based on the position, the augmented reality system 12 may depict the objects 38 that appear to be real objects positioned within the amusement ride system 10. In some embodiments, the augmented reality system 12 may provide multiple, sequenced augmented reality images 36 that form an animation of the objects 38 interacting with the ride vehicle 14. As such, the augmented reality system 12 may provide an entertaining environment for the viewing guest 22 positioned within the viewing area 18 and viewing portions of the amusement ride system 10.

In certain embodiments, the augmented reality system 12 may include additional sensors to enhance the augmented reality effects within the amusement ride system 10. For example, the augmented reality system 12 may include the guest-tracking sensor 68 that determines the position of the guest's head. Based on the position of the guest's head, the augmented reality system 12 may provide and/or update the augmented reality images 36 such that the objects 38 appear to realistically move within the amusement ride system 10. The objects 38 that appear to be closer to the viewing guest 22 may move more than the objects 38 that appear to be farther from the viewing guest 22 (e.g., the parallax effect). As such, the guest-tracking sensor 68 may allow the augmented reality system 12 to depict the objects 38 of the augmented reality images 36 in a realistic and interactive manner.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . ." or "step for [perform]ing [a function]. . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An amusement ride system, comprising:
a ride area;
a viewing area;
a ride vehicle configured to move within the ride area and relative to the viewing area;
a plurality of transparent displays fixedly positioned between the ride area and the viewing area and configured to enable viewing of the ride vehicle from the viewing area; and
a controller comprising one or more memory devices and one or more processors, wherein the one or more processors are configured to:
receive a sensor signal indicative of a position of the ride vehicle within the ride area; and
control an augmented reality image on the plurality of transparent displays based on the position of the ride vehicle such that the augmented reality image is viewable together with the ride vehicle via the plurality of transparent displays, and the augmented reality image is configured to move across each of the plurality of transparent displays in coordination with movement of the ride vehicle relative to the viewing area.

2. The amusement ride system of claim 1, wherein each transparent display of the plurality of transparent displays is disposed between two protective barriers.

3. The amusement ride system of claim 1, wherein the ride area comprises a ride track along which the ride vehicle is configured to travel, and wherein the viewing area comprises one or more queues for guests waiting to enter the ride vehicle.

4. The amusement ride system of claim 3, wherein each transparent display of the plurality of transparent displays is offset from the viewing area by a first distance and offset from the ride track by a second distance to enable the amusement ride system to appear to portray interaction between the augmented reality image and the ride vehicle when viewed from the viewing area.

5. The amusement ride system of claim 4, wherein the first distance is between 0.5 meters and 1 meter, and the second distance is between 1 meter and 2 meters.

6. The amusement ride system of claim 1, comprising a ride area sensor configured to determine the position of the ride vehicle relative to the viewing area and output the sensor signal indicative of the position of the ride vehicle to the controller.

7. The amusement ride system of claim 6, wherein the ride area sensor comprises a camera.

8. The amusement ride system of claim 1, wherein each transparent display of the plurality of transparent displays comprises an organic light-emitting diode (OLED) display.

9. An augmented reality system, comprising:
a transparent display configured to enable viewing of a ride vehicle of an amusement ride system from a viewing area, wherein the viewing area comprises one or more queues for guests waiting to enter the ride vehicle; and
a controller comprising one or more memory devices and one or more processors, wherein the one or more processors are configured to:
receive a first sensor signal indicative of a first position of the ride vehicle along a ride path; and
control an augmented reality image on the transparent display based on the first position of the ride vehicle.

10. The augmented reality system of claim 9, wherein the one or more processors are configured to:
receive a second sensor signal indicative of a second position of the ride vehicle along the ride path; and
control the augmented reality image on the transparent display based on the second position of the ride vehicle.

11. The augmented reality system of claim 10, wherein the augmented reality system is configured to synchronize the augmented reality image with the ride vehicle being at the first position and at the second position.

12. The augmented reality system of claim 11, wherein the augmented reality image comprises an object that appears to be at a first object position while the ride vehicle is at the first position, and at a second object position while the ride vehicle is at the second position such that the object appears to move from the first object position to the second object position.

13. The augmented reality system of claim 12, wherein the object appears to change depth relative to the ride vehicle between the first object position and the second object position.

14. An amusement ride system, comprising:
a ride area;
a viewing area;
a ride vehicle configured to move within the ride area and relative to the viewing area; and
an augmented reality system comprising:
a plurality of transparent displays configured to enable viewing of the ride vehicle from a viewing area and to separate the ride area from the viewing area; and
a controller comprising one or more memory devices and a processor one or more processors, wherein the one or more processors are configured to:
receive a first sensor signal indicative of a first position of the ride vehicle within the ride area; and
control an augmented reality image on the plurality of transparent displays based on the first position of the ride vehicle such that the augmented reality image is viewable together with the ride vehicle via the plurality of transparent displays and the augmented reality image moves across each transparent display of the plurality of transparent displays in coordination with movement of the ride vehicle relative to the viewing area.

15. The amusement ride system of claim 14, wherein the controller is configured to:
receive a second sensor signal indicative of a second position of the ride vehicle within the ride area; and
control which transparent display of the plurality of transparent displays will display the augmented reality image based on the second position of the ride vehicle.

16. The amusement ride system of claim 15, wherein the augmented reality image comprises an object that appears to be at a first object position while the ride vehicle is at the first position, and at a second object position while the ride vehicle is at the second position.

17. The amusement ride system of claim 16, wherein the one or more processors are configured to provide the object at the first and second object positions as an animation across the plurality of transparent displays.

18. The amusement ride system of claim 14, wherein the viewing area comprises one or more queues for guests waiting to enter the ride vehicle, and wherein the one or more processors are configured to control the augmented reality image to appear to guests in the viewing area as moving behind the ride vehicle as the ride vehicle moves within the ride area.

19. The amusement ride system of claim 14, comprising an augmented reality assembly, wherein the augmented reality assembly is fixedly disposed between the viewing area and the ride area, and the plurality of transparent displays are disposed within the augmented reality assembly and between supports of the augmented reality assembly.

20. The amusement ride system of claim 19, wherein the one or more processors are configured to provide the augmented reality image as an animation across the plurality of transparent displays.

* * * * *